US009878251B2

United States Patent
Hamilton, II et al.

(10) Patent No.: US 9,878,251 B2
(45) Date of Patent: *Jan. 30, 2018

(54) RELOCATION BETWEEN VIRTUAL ENVIRONMENTS BASED UPON PROMOTIONAL AND ALERT CONDITIONS

(71) Applicant: International Business Machines Corporation, Armonk, NY (US)

(72) Inventors: Rick A. Hamilton, II, Charlottesville, VA (US); James R. Kozloski, New Fairfield, CT (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 733 days.

This patent is subject to a terminal disclaimer.

(21) Appl. No.: 14/451,669

(22) Filed: Aug. 5, 2014

(65) Prior Publication Data

US 2014/0344761 A1 Nov. 20, 2014

Related U.S. Application Data

(63) Continuation of application No. 12/547,843, filed on Aug. 26, 2009, now Pat. No. 8,893,000.

(51) Int. Cl.
*G06F 3/0481* (2013.01)
*A63F 13/85* (2014.01)
(Continued)

(52) U.S. Cl.
CPC ............. *A63F 13/85* (2014.09); *A63F 13/10* (2013.01); *A63F 13/12* (2013.01); *A63F 13/61* (2014.09);
(Continued)

(58) Field of Classification Search
CPC .................................................. G06F 3/04815
(Continued)

(56) References Cited

U.S. PATENT DOCUMENTS 7,742,954 B1 * 6/2010 Handel ............. G06Q 30/0621
705/26.5
8,127,236 B2 * 2/2012 Hamilton, II .......... G06N 5/022
715/706

(Continued)

FOREIGN PATENT DOCUMENTS

WO 01/60072 8/2001

*Primary Examiner* — Reza Nabi
(74) *Attorney, Agent, or Firm* — Whitham, Curtis & Cook, PC; Maeve M. Carpenter (57) ABSTRACT

Awards of value are awarded to residents of a virtual universe for consenting to be teleported in response to invitations for teleportation. The consent can be made conditional upon any of a variety of circumstances which can be specified by a resident of the virtual universe for a corresponding avatar and which form rules for auto-teleportation. These conditions can be stored and searched and avatar and location status monitored and compared to the conditions to control issuance of invitations to increase the likelihood that an invitation will be automatically accepted. A delay before acceptance is also preferably provided to provide for graceful conclusion or termination of current avatar activity.

5 Claims, 7 Drawing Sheets

(51) Int. Cl.
*A63F 13/61* (2014.01)
*G06N 3/00* (2006.01)
*G06Q 30/02* (2012.01)
*G06F 3/0484* (2013.01)
*A63F 13/40* (2014.01)
*A63F 13/30* (2014.01)

(52) U.S. Cl.
CPC ...... *G06F 3/04815* (2013.01); *G06F 3/04842* (2013.01); *G06N 3/006* (2013.01); *G06Q 30/02* (2013.01); *A63F 2300/556* (2013.01); *A63F 2300/5506* (2013.01); *A63F 2300/5573* (2013.01)

(58) Field of Classification Search
USPC .......................................................... 715/706
See application file for complete search history.

(56) References Cited

U.S. PATENT DOCUMENTS

| | | | | |
|---|---|---|---|---|
| 8,893,000 B2* | 11/2014 | Hamilton, II | ......... | G06N 3/006 715/706 |
| 2006/0242639 A1* | 10/2006 | Manion | ................. | G06Q 10/10 717/169 |
| 2007/0123353 A1* | 5/2007 | Smith | .................... | A63F 13/12 463/42 |
| 2008/0004980 A1* | 1/2008 | Hernandez | ............ | G06Q 30/00 705/26.41 |
| 2008/0201227 A1* | 8/2008 | Bakewell | ............... | G06Q 30/02 705/14.19 |
| 2009/0013263 A1* | 1/2009 | Fortnow | ................ | G06Q 10/10 715/753 |
| 2009/0046109 A1* | 2/2009 | Hamilton, II | ....... | G06F 3/04815 345/619 |
| 2009/0083225 A1* | 3/2009 | Jacobs | ................... | G06Q 30/02 |
| 2009/0115776 A1* | 5/2009 | Bimbra | ................... | A63F 13/69 345/419 |
| 2009/0177977 A1* | 7/2009 | Jones | ..................... | G06N 3/006 715/753 |
| 2009/0241036 A1* | 9/2009 | Reisinger | ............... | A63F 13/10 715/757 |
| 2010/0005394 A1* | 1/2010 | Dubnov | ................ | G06F 9/4443 715/733 |
| 2010/0036735 A1* | 2/2010 | Hamilton, II | ......... | G06Q 30/02 705/14.55 |
| 2010/0313145 A1* | 12/2010 | Dillenberger | ......... | G06Q 10/06 715/757 |
| 2011/0055135 A1* | 3/2011 | Dawson | ................ | G06Q 30/02 706/47 |
| 2011/0055136 A1* | 3/2011 | Hamilton, II | ......... | G06N 3/006 706/47 |
| 2011/0055732 A1* | 3/2011 | Dawson | ............. | G06F 3/04815 715/757 |
| 2011/0295642 A1* | 12/2011 | MacFarlane | .......... | G06Q 10/02 705/7.19 |
| 2014/0344761 A1* | 11/2014 | Hamilton, II | ......... | G06N 3/006 715/850 |

* cited by examiner

RELOCATION BETWEEN VIRTUAL ENVIRONMENTS BASED UPON PROMOTIONAL AND ALERT CONDITIONS

FIELD OF THE INVENTION

The present invention generally relates to the production and management of interactive virtual universes presented to users on computers linked by a network and, more particularly, to relocation or teleportation of avatars in response to the sender of a teleportation invitation upon the consent of the avatar.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Further, once such objects or local environments become part of a VU, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

Residents of a VU may control the teleportation of their avatar(s) to any location in the VU of which they may be aware or may find by searching the VU. As an additional mechanism to enhance awareness of teleportation locations and the VU experience, in general, any user or agent connected to the VU may issue invitations for teleportation to a particular location which may be freely accepted or rejected by the recipient. Such invitations may be social or may involve some business obligation undertaken by the recipient in which the recipient has agreed to respond to invitations in a particular manner such as an agreement to respond within a given time to an invitation from a system monitoring agent to respond to a detected real system condition which is emulated by the VU. On the other hand, a major function of teleportation invitations has become the potential for advertising or promotion that they may provide. However, to date, such advertising has not been as effective as it potentially may be.

SUMMARY OF THE INVENTION

It is therefore an object of the present invention to provide a mechanism for enhancing the advertising and promotional potential of VU teleportation invitations.

In order to accomplish these and other objects of the invention, a method and computer program product are provided comprising or performing steps of automatically accepting a teleportation invitation based on a rule, and teleporting said avatar in accordance with said teleportation invitation. These steps are preferably supplemented by collecting conditions of consent to form rules and comparing current VU location and avatar status therewith to control the issuance of teleportation invitations at times that maximize the likelihood that a rule for a particular avatar will be satisfied and the invitation accepted whereupon automatic teleportation can be performed without manual acceptance.

In accordance with another aspect of the invention, a virtual universe is provided including an arrangement for issuing a teleportation invitation to and avatar, an interface for manually accepting or rejecting the teleportation invitation, and an arrangement for automatically accepting the teleportation invitation based on at least one rule established for the avatar.

In accordance with a further aspect of the invention, a method, particularly for advertising is provided including steps of collecting conditions under which respective avatars consent to automatic teleportation, issuing awards of value to avatars for providing such consent, issuing an invitation to the avatar, and automatically accepting the invitation when the conditions are met.

In accordance with yet another aspect of the invention, a method is provided comprising or performing steps of issuing a teleportation invitation to an avatar in a virtual universe, automatically accepting the teleportation invitation based on a rule, and teleporting said avatar in accordance with the teleportation invitation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
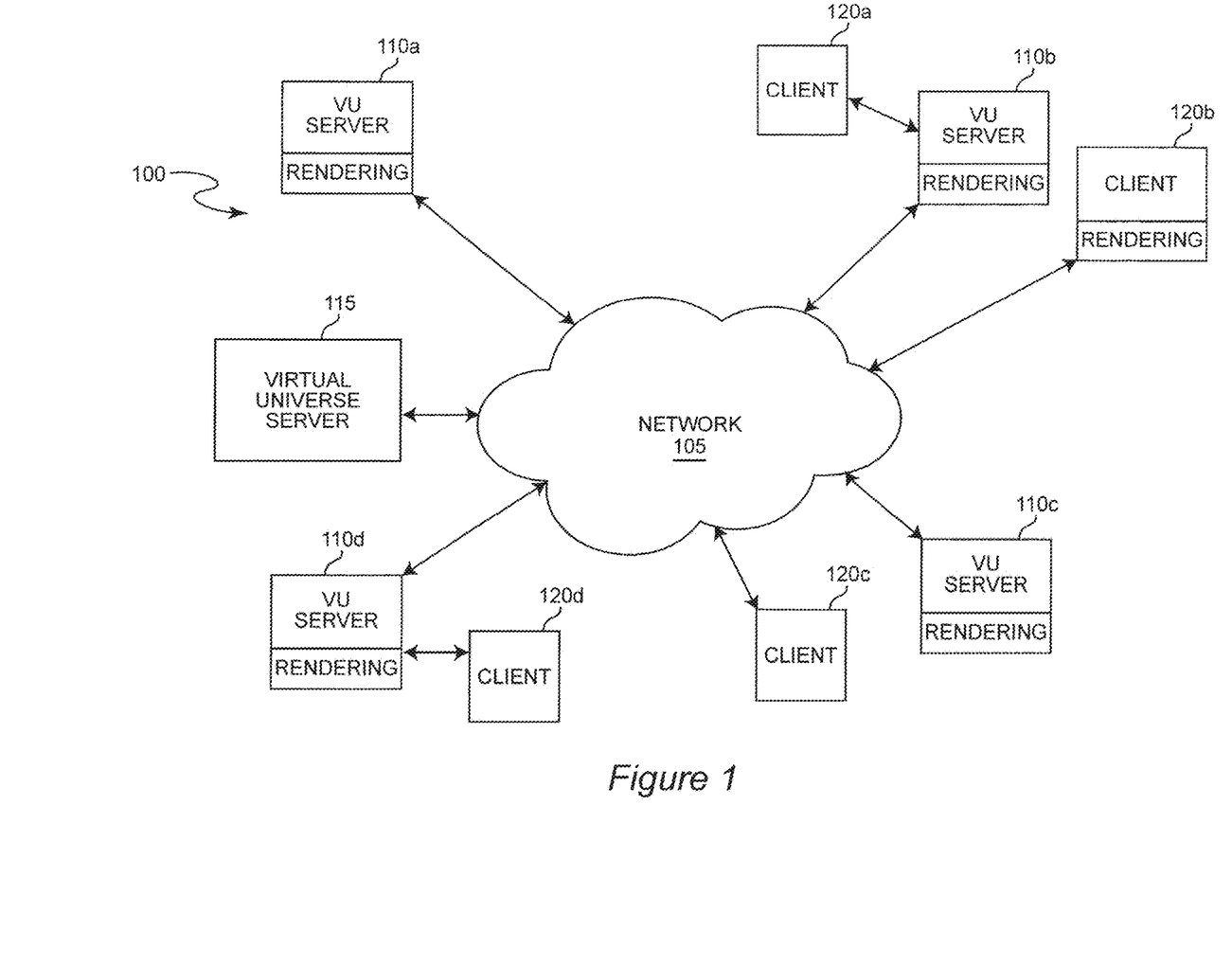
FIG. 1 is a high-level block diagram or data flow diagram of a network-based virtual universe.
Figure 2:
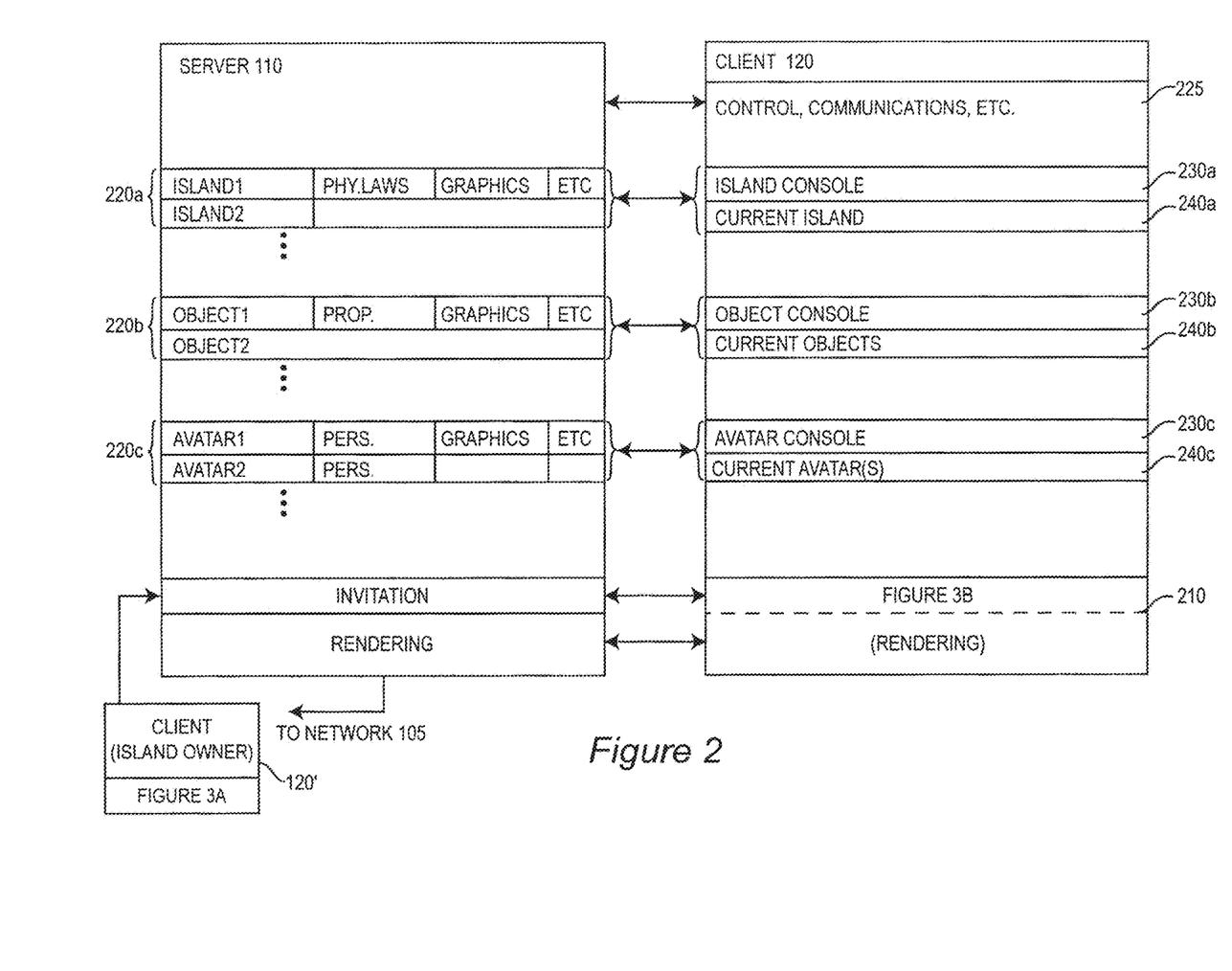
FIG. 2 is a high-level block diagram containing basic details of the relationship between a VU server and a VU client.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

Figure 6:
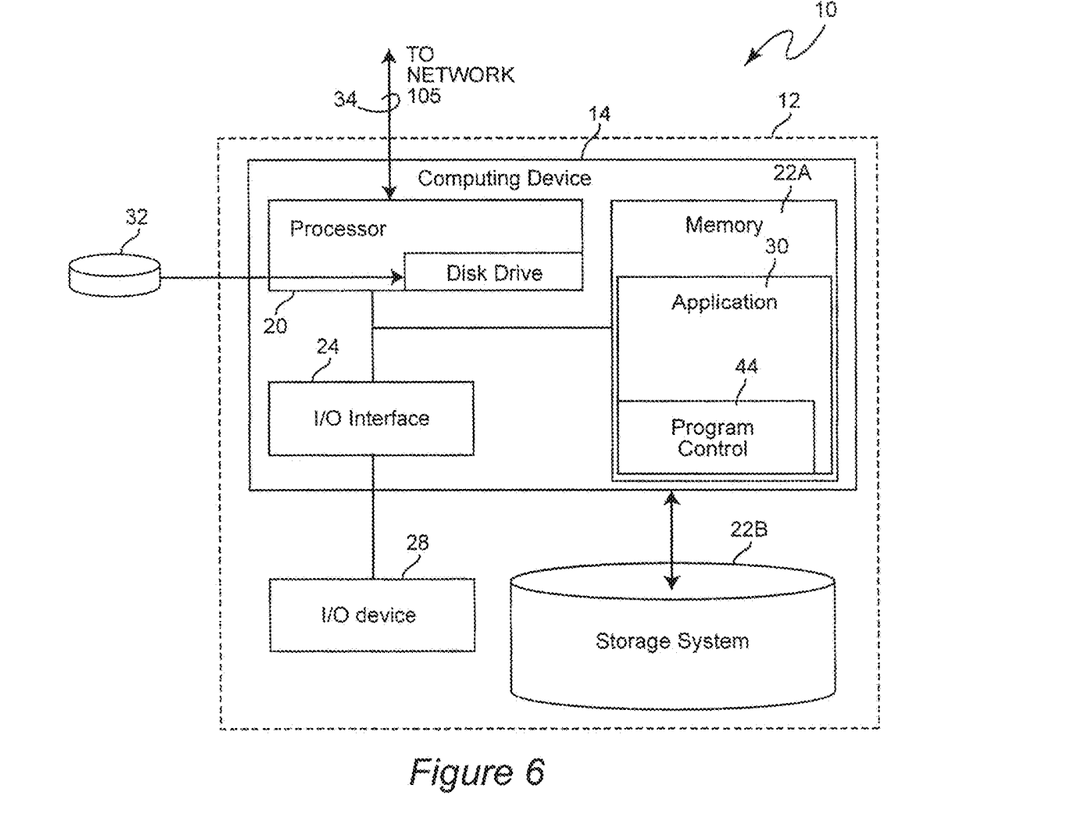
FIG. 6 illustrates a suitable processor architecture for use as a server or client in FIG. 1.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 6 and discussed below.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for rendering to be done most expeditiously. For example, when rendering is required at, for example, client 120a for interaction of a particular avatar with an object while changing location on an island, the rendering (including occlusion or hidden line processing) could be performed at the local server 110b or distributed over any or all of servers 110a-110d And possibly even including some client terminals (e.g. 120b) having rendering capability, depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering to the network or a local client from a server (e.g. as compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers automatically, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. In order to create islands, objects and avatars, some arrangement for doing so, preferably a graphic user interface (GUI) which may be in the form of one or more screens (possibly nested) functioning as a console 230a-230c may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220a, 220b and 220c for islands, objects and avatars, respectively. Similar GUIs 240a-240c are also provided (but preferably resident on the client processor) for control of the current island, object and/or avatar, once it has been created. Suitable arrangements for providing GUIs or consoles 230a-230c and GUIs 240 are known and others providing enhanced user/resident convenience is foreseeable. The current island (220a) with its associated objects (220b) correspond to the current location of the current avatar (220c) and are thus the object of teleportation or relocation invitations to which the present invention is directed for management thereof as will now be discussed.

Some definitions which will be helpful in the following discussion are:

1. Avatar—an avatar is a graphical representation the user/resident selects that others can see, often taking the form of a cartoon-like human but which can be produced with any degree of detail, whether real or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location to another VU location even if the locations are geographically (e.g. in the context of the topology of a particular VU) far apart. As indicated above, a user can teleport to any other location of which he may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer.

The potential for advertising and commercial promotion in a virtual universe is well-recognized since the VU supports a significant level of experience of the product, location or service being advertised or promoted. Such potential becomes more fertile as the resident populations of virtual universes continue to grow. However, all such advertisement and/or promotion in a virtual universe are location specific, as it is in the real world because it is necessary for members of a target audience to be in contact with the advertisement or promotional material. For example, in the real world as well as in virtual worlds, a person must be in the proximity of the advertisement or promotion in order to perceive it and even broadcast advertisements and promotions are specific to the channel or frequency on which they are broadcast and are received only by persons who may be watching or listening to such a channel or frequency which can be freely chosen. Given the size and scope of existing and foreseeable virtual universes which are rapidly growing, it is becoming less likely that a given target avatar will be in the proximity of an advertisement or promotional information that the advertiser or promoter would like that avatar to view.

In the real world, several marketing techniques such as providing a "free home trial" of products for a limited period of time or providing a "vacation package" with accommodations to prospective customers for real estate promotions have been somewhat effective in some cases. Such techniques are characterized by providing some incentives to potential customers for submitting to a degree of exposure to the desired advertising. The significant degree of lack of effectiveness of such techniques experienced in the real world is considered to be partially due to the cost of the incentives (or corresponding risk of loss in "free home trial" types of incentives) and the cost to the potential customer in time, inconvenience and related costs of accepting the incentive. That is, in many instances, the maximum incentive the advertiser can justify often will be (or will be perceived to be) less than the benefit to or actual costs incurred by the potential customer; causing most such promotional offers to be routinely ignored or rejected.

The inventors have discovered, however, that the flexibility in using such techniques and the effectiveness thereof, which are very limited in the real world, can potentially be greatly enhanced and further useful functionalities provided by providing incentives for exposure to advertisements to residents of a virtual universe or allowing a degree of control by the advertiser to accrue to the benefit of the potential customer within a VU environment while cost to the potential customer can be effectively minimized.

Specifically, using a virtual universe environment, actual costs and risks to the advertiser can be greatly reduced while the possible value to the potential customer by providing discounts, money (either virtual or real), access to restricted functions or locations, upgraded avatar features (e.g. rendering detail or clothing) or the like, may be greatly increased while ancillary cost to the potential customer can be greatly reduced or limited to time which may be suitably limited or restricted to time periods which are reasonably convenient. Further, the advertisement or promotions to which the potential customers are exposed can often have much more immersive, sophisticated and compelling content while being of relatively low cost since it can be presented in a VU space that the advertiser or promoter owns rather than being presented broadly across the VU or in areas owned by others and which may not be possible due to location-based advertising inhibitors which are a feature of some virtual universes. Additionally, highly immersive advertising virtual environments are not likely to be perceived as being as offensive as a potential customer may anticipate in a real-word experience, simply because the environment is virtual.

Moreover, the demographics of selecting appropriate target customers may be greatly facilitated and simplified in a VU environment by, for example, searching through metadata for residents or even avatars or their VU usage patterns. Further, for VU residents who accept participation in the circumstances created and managed in accordance with the invention, the invention guarantees the exposure of the selected, participating avatar to the advertising or promotional material while allowing an advertiser or promoter to concurrently make many different advertising or promotional presentations to the same or different groups of targeted potential customers and to have a high degree of control over the conditions of the VU site(s) where each presentation is to be made.

Additionally, beyond the function of presenting advertising, the invention provides mechanisms which can provide important administrative alerts and warnings such as warnings associated with a VU overload or outages by, for example, rapidly off-loading avatars from certain overloaded regions or servers to less-used servers and regions. The invention also provides mechanisms for obtaining responses to warnings and alerts unrelated to the VU such as a warning from a real-life company or town and which may also serve to protect the VU such as teleporting maintenance staff to a location where a real-life system problem can be diagnosed and/or remedied.

While invitations for teleportation which can be either accepted or refused are a feature of virtual universes currently in use, the invention, in accordance with its most basic principles, provides for a rules-based teleport facility that allows a resident to specify, for an avatar, conditions and/or circumstances under which they agree to be teleported, in an automated fashion and without rejection of a teleportation invitation, to a location of the sender's choice in return for the sender subsidizing rewards to the participating avatars or their corresponding residents based on the degree to which they are willing to participate. This functionality is sometimes referred to as auto-teleporting since it is performed automatically in response to an invitation when agreed upon rules are met rather than requiring acceptance or rejection of the invitation by the invitee. Thus, the invention provides incentives in a system and method whereby avatars are automatically transported to advertising or alert locations selected by another resident which may be a sponsor, service provider, advertiser or any other user or agent connected to the VU. That is, under certain conditions established in advance by consent of a resident or avatar (which may be compulsory in some virtual universes), an invitation will be automatically accepted and cannot be refused. The system and method of the invention is beneficial to the avatar and corresponding resident because of the compensation (e.g. business arrangement, rewards, etc.) or for facilitating compliance with agreements made. By the same token, the other party to such agreements with the resident may be assured of the compliance of the resident with that agreement. The invention is particularly advantageous for advertisers because more avatars will view their promotional materials which may be arranged to be of increased effectiveness while being provided more economically.

In the following description of a preferred embodiment of the invention, it should be borne in mind, as alluded to above, that teleportation and the associated rendering of avatars is computationally intensive and the issuer of a teleportation invitation undertakes to cause such teleportation by updating (in 240a) the location of an avatar specified at 240c of FIG. 2 such that server 110 can communicate appropriate information including metadata to the server(s) handling and performing rendering for the location specified in the invitation. Therefore, it is considered both administratively and functionally desirable for invitations for which consent has been given for automatic acceptance to be selectively issued and possibly such selectivity is more important even than in regard to invitations issued other than through use of the invention. That is, the location indicated in an invitation must be capable of (and correspondingly managed for) accommodating avatars which will be unconditionally teleported to it in response to an invitation in accordance with the invention while the processing burden of teleportation should be limited to residents or avatars which are or can be determined to be likely prospects for responding favorably to advertising which will be provided (or capable of providing whatever response may be desirable, such as responding to an alarm).

An exemplary preferred architecture for achieving the above-described functionality and providing advantages in a virtual universe which have been less than fully successful in real-world experience will now be described in connection with FIGS. 3A and 3B. It is to be understood that the invention can be implemented to advantage using the architecture of FIG. 3B alone to provide for rule-based automatic acceptance of invitations but is preferably implemented together with the architecture illustrated in FIG. 3A so that the rules for automatic invitation acceptance will be met for the preponderance of invitations issued. It should also be appreciated, however, that the architecture illustrated in FIG. 3A, alone, can be used to advantage to predict avatars which will be likely to accept invitations and to avoid issuing invitations to avatars at times which are inconvenient or other than times agreed upon in advance. Further, it should be understood that the high-level schematic diagrams of FIGS. 3A and 3B can also be understood as data flow diagrams which may be followed through the operations and functions included in the methodology of the invention and, whether understood as structure or method, can be and preferably are, implemented in computer software that may be embodied as a computer program product comprising signals stored on a computer readable medium or transmitted through a communications medium to cause a processor to be configured to provide the functions and functional elements illustrated.

Figure 3A:
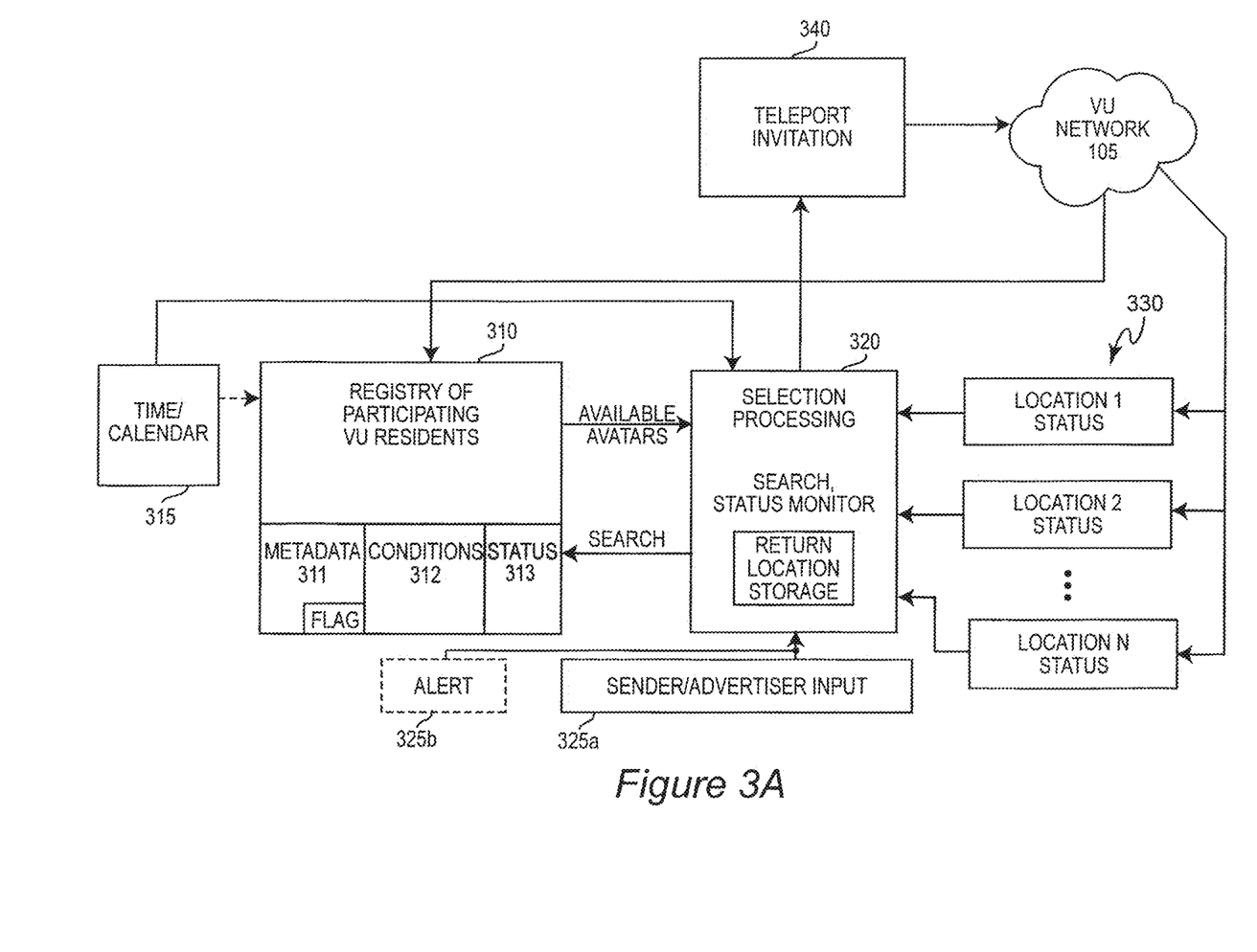
FIGS. 3A and 3B are high-level block diagrams useful for explaining the functionalities of the present invention and enabling the practice of the invention in order to derive them.

Accordingly, a preferred architecture for searching for appropriate and available avatars and issuing invitations is illustrated in block diagram form in FIG. 3A which is preferably implemented in software at the client or server 120' corresponding to any resident or avatar wishing to issue or manage teleportation invitations through the use of the invention. Those skilled in the art will also appreciate that FIG. 3A may be also understood as a data flow diagram, as well.

As illustrated in FIG. 3A, identification of residents or avatars which have consented to accepting teleportation invitations are identified in a registry 310 to which the client processor of the sender at least has access if not resident thereon, as is preferred. This registry can be compiled in many ways which will be apparent to those skilled in the art such as including all residents or avatars of the VU if consent is compulsory for participation in the VU or soliciting consent upon the first login of a resident or avatar on the VU which can thereafter be maintained as a flag with (preferably coded) conditions of consent (or forbearance against refusal) of teleportation invitations either unconditionally or under specified conditions of time or VU location. It is desirable that this registry include metadata 311 including some information about interests or VU usage patterns or the like for participating residents or avatars which can be collected or downloaded from client 120 or associated server 110. The conditions 312 associated with the consent of each participating resident or avatar are also preferably maintained in registry 310 together with the current status including current location of each avatar in the registry is also maintained as depicted at 313. It is contemplated, in this regard, that location may be a desirable condition for expression of consent since interruption of an avatar in some locations (e.g. a business location) may be objectionable, while somewhat less so in other locations (e.g. a principally social location) or potentially desirable, for example, on a periodic basis in other (e.g. recreational) locations such as periodic advertisement "breaks" during viewing of a program at or through a location. This information is provided through VU network 105 and, if not resident on a sender's client or server processor, is available from virtual universe server 115 (FIG. 1) through network 105.

It is preferred that some processing for invitee selection be performed and processor 320 is preferably provided for that purpose, either as discrete hardware or implemented on the sender's client or server processor 120' (FIG. 2). However implemented (which is not at all critical to the successful practice of the invention), processor 320 preferably receives inputs from an input device 325a such that a user can specify general or specific characteristics of a desirable invitee and/or from an agent 325b which may monitor specified conditions and issue an alert for a particular invitee or group of invitees. Processor 320 preferably also receives inputs from associated teleportation locations 330 in regard to the status of each. (It should be appreciated in this regard that it is desirable and possible without use of the invention for an arbitrary avatar to visit an advertising site and thus, for example, if the sender wishes to monitor and/or control the population or other conditions at a site, it is preferable to do so directly rather than indirectly through tracking of invitations. Additionally, the issuer of an invitation may be considered to have some responsibilities toward a teleported avatar and may wish to remove an avatar from a disruptive incident in a VU and to transport the avatar to a safer area or alerting the avatar to financial risks, market conditions, scam artists currently in the VU or possible harmful scripts, similar to computer viruses, which may be encountered unpredictably in the VU. Thus, the location status may be used as a condition to either invite additional avatars as conditions permit or to remove or transfer avatars to other locations as conditions may require.) Processor 320 also receives a time/calendar input from 315 (which, also or alternatively, can be provided to the registry 310 for matching with conditions 312). Processor 320 can then conduct a search through metadata 311, conditions 312 and avatar status 313 to determine avatars that are both available and suitable for invitation to a particular location. Identifiers of avatars found available and suitable are returned from registry 310 to processor 320 which can then issue an instruction for issuance of a teleportation invitation 340 over network 105. It should be noted, for reasons of and to support functions or operations which will be discussed in greater detail below, it is considered very desirable to maintain data in processor 320 indicative of the location from which an avatar is to be transferred or teleported when an invitation is issued.

Figure 3B:
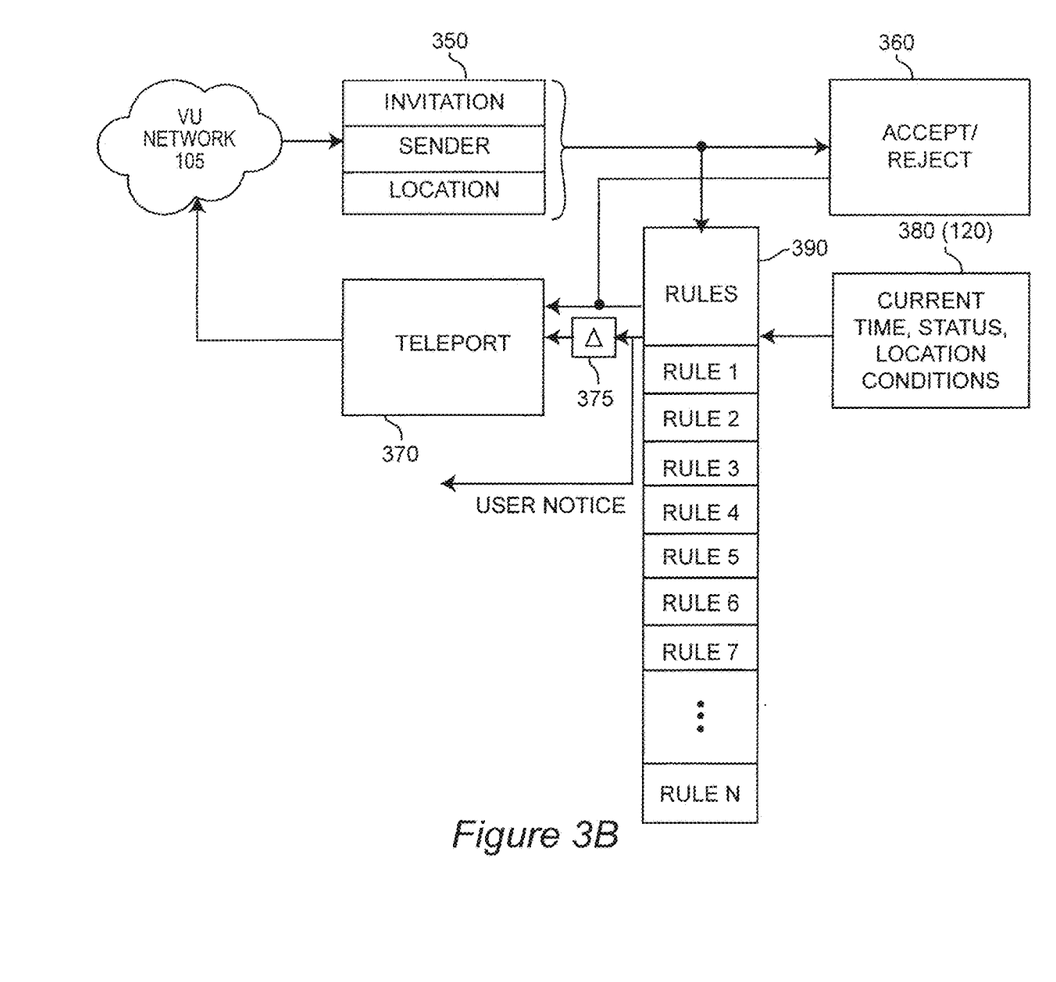

Referring now to FIG. 3B a preferred architecture for implementing the invention at the resident or avatar client or server (as depicted generally in FIG. 2) will now be explained. It will be immediately evident that elements 350 (e.g. a register for temporarily holding the sender and location information in regard to an invitation), 360 (e.g. a menu or dialog box emulating a switch for acceptance or rejection of and invitation and 370 (generally indicating teleportation processing) represent the normal functionality provided by known virtual universes and that current time, avatar status and location information source 380 (which could be implemented in the manner discussed above in regard to client or server processor 120 and which preferably include information regarding current or recent avatar activity, current or recent interactions with other avatars or objects at a location, the general context of the avatar such as business or leisure and the like) which are considered in the application of the rules discussed below) and rules processing 390 provide a parallel path between invitation information 350 and teleport processing 370 but which results in an unconditional acceptance of the invitation if the rule is satisfied by the current time, status and location conditions of the avatar. By the same token, under certain rules which might deny or defer acceptance of automated teleportation, the normal mode of providing a dialogue box or the like for acceptance or rejection of an invitation may be used as a default.

Any number of rules can be provided which can express any possible desired conditions under which consent to acceptance of a teleportation invitation can be provided. Seven exemplary rules considered to be preferable by the inventors (in addition to the rule of always unconditionally accepting an auto-teleport invitation which is substantially trivial because an unconditional consent requires no analysis to determine if the rule is met) will now be discussed along with suggestions of suitable and corresponding awards. In general:

I. Login Teleport Rule—

This teleport rule allows an advertiser or other user to update the initial location of an avatar upon login with the desired teleport location and would thus provide an initial location of the avatar at the desired location when the user accesses the VU. This rule is considered to be highly desirable for and likely to be adopted by both residents and advertisers since it is implemented prior to any other avatar activity being initiated and thus avoids any interruption of any other avatar activity. Therefore, awards may be relatively minimal for consenting to such a rule. This rule is somewhat similar to unconditional auto-teleportation except that it is to occur at login of a user into the VU. Thus it may be sent while the user is logged off and/or the client server powered down. Accordingly, invitations under this rule may be stored at a network server and the time the actual auto-teleport operation is executed may be highly uncertain.

II. Role or Status Based Teleport Rule—

This rule would establish role or status based guidelines for how and when an avatar could be teleported. For example, if the avatar is in a "leisure" mode or status, then teleporting would be required based on the settings of other rules. Conversely, if the avatar is in a "business" role or mode, automated teleportation may be disabled or permitted only upon manual acceptance (e.g. through control 360). The role or mode may be set manually or automatically based on other criteria or criterion such as location. Since this rule largely functions to override other rules and refuse teleportation under certain circumstances, no award is appropriate from the standpoint of the sender or could justify reduction of awards for acceptance of other rules.

III. Activity Based Teleport Rule—

Activity based rules take into account the current or recent activity of an avatar to determine eligibility for automated teleportation. For example:

a.) working—any activity that indicates or infers a work role could be used to deny, defer or prompt for a teleportation, b.) general context—for leisure only users, automated teleporting may always be permitted whereas for business users, a rule having the effect of rule IIIa would apply but is invoked by the general context of a user rather than by an activity, c.) camping—if a user is "camping" (a rewards based stay at a location) teleportation may not be desired until that stay is complete although a prompted teleport (e.g. using 360 and a dialogue window such as that of FIG. 4) may be appropriate, d.) chatting—this rule is essentially a special case of rule IIIa but where deferral of an invitation to the conclusion of chatting is appropriate, e.) teleporting—this rule is essentially a combination of rules IIIa and IIIb but may also be governed by other rules including VU operational considerations for redirection of a teleport which is already in progress, f.) walking/running/flying—these activities may indicate that the avatar has a current purpose in mind and a prompted teleport is more appropriate than an automated teleport, g.) viewing advertisements—this rule is essentially the same as rule IIIc but could involve preemption of one advertiser by another based on fees paid by respective advertisers to the VU provider.

IV. Activity and Award Based Teleport Rule—

This rule would build upon rule III, above, and would allow automated teleportation based on making a larger award to the invitee than that associated with the avatar's currently expected award.

V. Group Based Teleport Rule—

If an avatar is active in a group activity, the avatar may be allowed to reject automated teleportation unless other (e.g. some or all) members of the group accept the same teleportation. Additional award may be appropriate based on the number of other group members accepting teleportation. The number accepting teleportation is also communicated to location status monitor/register 330 to confirm that the accepting members of the group can be accommodated at the teleportation destination (e.g. as a matter of associated processing or rendering capacity).

VI. Schedule Based Teleport Rule—

This rule may be applied independently or in combination with other rules and allows an avatar to establish particular times at which automated teleporting is acceptable (e.g. after 6:00 PM or on alternate Mondays and Tuesdays). Awards would be based, for example, on the proportionate amount of time (e.g. per week or month) for which automated teleporting was accepted.

VII. Location Based Teleport Rule—

This rule may also be applied independently or in conjunction with other rules and may be consented to or not upon entrance of an avatar into a particular area where notification of the option and corresponding incentives may be made to the avatar.

As perfecting features of the invention which are not necessary to operation in accordance with its basic principles, several types of timing options can be provided. For example, the automated teleportation discussed above is contemplated to be a substantially instantaneous and mandatory summons to a specified location. However, some delay 375 in initiating teleportation may be optionally provided. For example, notice of the teleportation may be given to a user/avatar when the invitation is received and/or when a teleportation rule such as those discussed above is determined to be satisfied and the actual teleportation process initiated only after a suitable delay. For example, a delay of thirty seconds (possibly indicated by a count-down timer displayed to the user) can be provided and the invitee possibly given some capability of controlling it in order to complete an activity. The delay can thus be used to complete or gracefully terminate current avatar activity (e.g. a chat session) or exercise some option in regard to the teleportation. Such conveniences to the user may be reflected in implementation of the rules discussed above and may substantially simplify the application and/or implementation thereof such as substituting for or supplementing a prompted teleportation. It should be noted that such a delayed teleportation may not be appropriate for all circumstances, such as a notification of an emergency and teleportation of an avatar to respond to it, and thus is preferably implemented on a selective basis, possibly including a variable delay 375 depending on the severity of an alert.

As another timing option, the teleportation times can be scheduled, such as providing for them to occur at a particular time each day or different times on certain days of the week or month or periodically (e.g. each hour on the half hour). This timing option would allow a user to arrange other activities to avoid interruption by the scheduled teleportation.

A further timing option is consent to teleportation for a particular amount of time which, when such time has elapsed, the avatar is automatically returned to the environment from which it had been teleported, as stored in selection processor 320. With this option, incentives may be adjusted in accordance with the agreed duration of the teleportation. This timing option, particularly if combined with the scheduled teleportation timing option described above would provide intermissions closely resembling commercial advertisement breaks in other media.

Another possibly desirable perfecting feature of the invention which may be optionally provided is to allow the user to cancel a teleportation after the teleportation has been completed, perhaps following an initial period such as two minutes of exposure to advertising at the teleportation destination whereupon the avatar would be immediately teleported back to the previous location by, for example, providing an option button after a given duration. It is contemplated that providing this option would be particularly reassuring to users and helpful in obtaining their initial consent to use of the invention. This option may also be useful to advertisers in allowing a potential customer avatar who had determined a lack of interest in the subject matter of the advertisement to cancel the teleportation so that another, possibly more receptive, avatar may be summoned.

Another perfecting feature of the invention which may be optionally provided is a proximity feature in regard to a potential customer avatar. By scanning data in, for example, virtual universe server 115, or possibly status information for a location (at 330) or a particular avatar (at 380) other avatars proximate to a potential customer avatar may be identified. The target avatar may also elect to participate in mandatory teleports of friends and colleagues in return for incentives (but which the friends or colleagues may or may not have the option to decline). Thus other avatars which may be candidates for teleportation may be identified and included in registry 310 with suitable teleportation conditions (and awards) associated therewith may be identified by selection processing 320.

Another optional perfecting feature deemed to be within the scope of the invention is a hand-off feature. That is, an avatar, in return for a suitable award, may consent to sequential automated teleportation sessions to proceed one after another. Thus, an advertiser may have the option of teleporting an avatar to an immersive advertising environment and then, after a set period of time in that environment, controlling an automated teleportation to another immersive advertising location and so on and may be a basis for commercially valuable agreements between advertisers/promoters. This function may be easily accomplished by selection processing 320 using sequential locations for eligibility of substitution for the stored return location or the like, with or without a timer. Such sequences of automated teleportation may continue for a set number of teleportations, a set period of time or until the user cancels the teleportation, if the user is permitted to do so.

Figure 4:
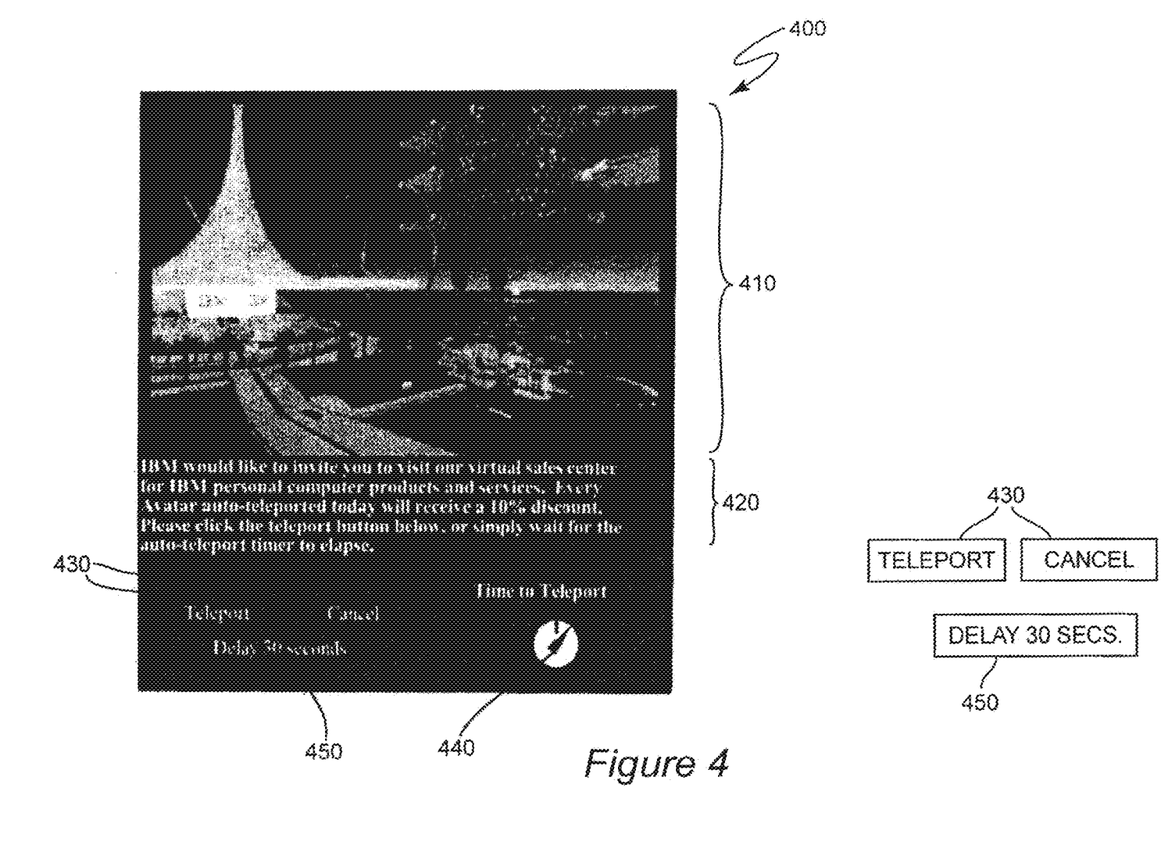
FIG. 4 is an exemplary dialogue window useful with some implementations of the invention.

An example of operation of the invention will now be discussed in connection with FIGS. 4 and 5. FIG. 4 illustrates an exemplary auto-teleport pop-up screen 400 suitable for practice of the invention. It should be appreciated that the exemplary screen illustrated in FIG. 4 has several features in common with or at least desirable to include in invitations of the type used in known systems and preferably can be used as such. These features may include an image 410 or short image sequence (e.g. movie clip or animation) depicting the site or other graphics that may enhance likelihood of acceptance, but not necessarily produced as a "preview" of the teleportation destination, and a short text presentation 420 which may include some statement of the incentives currently offered for acceptance of the invitation whether by auto-teleportation or not (e.g. by accepting or rejecting the invitation using displayed "buttons" 430.

These features are desirable in an invitation regardless of whether the screen 400 of FIG. 4 is used in connection with the invention as a matter of economy since distinct screens need not be provided for sending invitations to avatars or residents who may not have consented to auto-teleportation or where conditions applicable to their consent may not be met. That is, if consent to auto-teleportation was conditioned, for example, on an activity based rule, and the avatar changed activity concurrently with the issuance of the invitation, conditions of the rule might be met at the time the avatar was determined to be suitable for invitation but may not be met when the invitation reaches the avatar. Similarly, an issuer of invitations might wish to issue an invitation to one or more avatars at a time of low traffic at the destination and without regard to agreed conditions for auto-teleportation since the avatar might wish to accept it.

A preferred feature illustrated in FIG. 4 which is specific to the practice of the invention and serve to indicate that an auto-teleport operation is in progress are a "remaining time" indicator 440, preferably provided as both text and graphics indicating the time remaining before the auto-teleport operation will be carried out. It is also desirable in connection with the practice of the invention to optionally provide an additional delay "button" 450 or other selection mechanism which can be used to defer the auto-teleport operation for a brief period of time. Actuation of such a "button" would cancel the screen and return the display to the screen seen by the user prior to the pop-up invitation screen of FIG. 4 in order to allow the user to complete or gracefully terminate the activity in progress. The pop-up invitation screen would then reappear five to ten seconds or so before the auto-teleport operation and, if the user had not successfully completed or terminated the activity. the user could actuate the button again, and so on, until the activity is completed. It should be noted, however, that while button 450 allows the auto-teleport operation to be delayed for one or more short periods of time, it does not allow the auto-teleport to be canceled. In this regard, the "cancel button" 430 may be deactivated when auto-teleport rules are satisfied but could be left active to allow the user to decline the invitation contrary to the agreed upon consent in some circumstances. The "teleport button" should, however, preferably remain continuously active to allow an invitee to accept the invitation immediately but could be deactivated, if desired, such as when an invitation is issued slightly before return teleports of previously auto-teleported avatars to optimize (but not maximize) destination occupancy so that large processing loads associated with high destination occupancy (e.g. when groups of invitees may overlap) and concurrent teleportation of avatars into and out of a destination. That is, early acceptance and teleportation may be undesirable if it would result in crowding of the destination and/or unduly increase processing loads.

Figure 5:
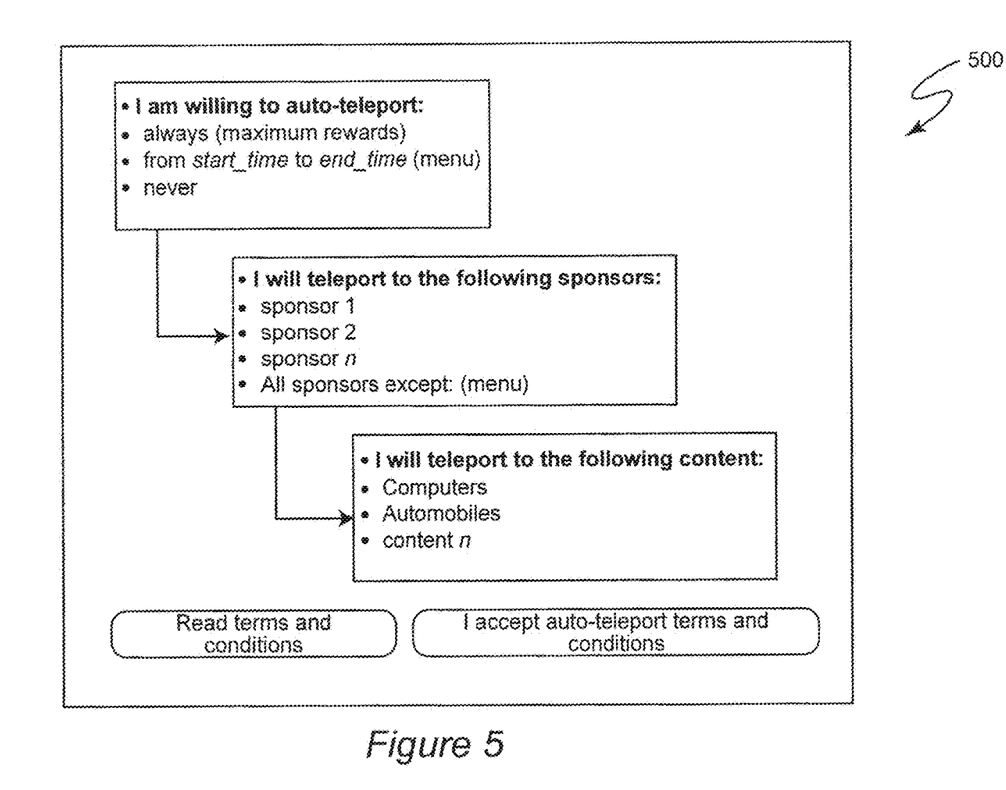
FIG. 5 is an exemplary interface for developing and controlling the functionalities developed as depicted in FIG. 3.

FIG. 5 is an exemplary screen 500 for a user interface that may be presented to a user periodically or at will to encourage and obtain user agreement to participation in use of the invention. In general, it will be desirable to present this screen upon user login to a VU or when a previous acceptance/consent has expired or is about to expire. It is also desirable to allow the screen of FIG. 5 to be invoked by a user in order to provide for the consent to be changed from time to time.

Basically, the screen illustrated in FIG. 5 is a series of menus which may be freely customized to implement the invention in a manner which, in the opinion of invitation issuers will maximize user participation in use of the present invention without being unduly intrusive. The basic function of this interface is to obtain user responses to options provided by the rules, as described above, which are supported in a given implementation of the invention. Therefore, several menus can be presented as parts of the same screen in the options are relatively few or presented as a sequence of menus. Any desired amount of information or number of options may be presented. Some important features that may be presented will be discussed below while others and their implementation will be apparent to those skilled in the art from discussion of similar features.

The first menu depicted allows the user to define the degree of participation and preferably allows a choice between full participation ("always") for which rewards should generally be maximized, the period for which subsequent choices or menu selections will remain in effect or to "opt out" of participation in use of the invention (if allowed). Unless it is understood that the selection is for a specific period of time such as the current session, the restricted time menu option will preferably specify the overall bounds of selective participation in use of the invention (e.g. a particular month) and invoke another menu allowing times of participation to be specified on a more fine-grained basis (e.g. certain days and/or times of day). If a "never" response is selected, the interface would be closed, preferably with a dialog box to avoid future presentations of the screen.

The above-described initial menu selection is then followed by a series of additional options to allow the user to specify other conditions of acceptance that are represented in the above-described rules. Menus can be either positive (e.g. I will teleport . . . ) or negative (e.g. I will not teleport . . . ) and may include options which are generally inclusive with exclusions (e.g. all sponsors except . . . ) which also may invoke additional menus. Menus may be organized by particular sponsors, particular subject matter of interest, particular activities (e.g. I will not teleport from business), particular locations (e.g. I will not teleport from an office) or any other criterion relevant to the above-described rules of any other rules which are supported in a given implementation of the invention. Once the users preferences and the scope of consent defined by the user by selections from menus such as those of FIG. 5, supported rules can be logically expressed in, for example, a Boolean expression, for each avatar in a potentially unique manner stored as conditions 312 and rules 390 discussed above in connection with FIGS. 3A and 3B and used in selection of avatars to which invitations for auto-teleporting in accordance with the invention may be issued and to provide an alternative to manual invitation acceptance by a participating user.

In view of the foregoing, it is seen that the invention provides a mechanism for consensual required teleportation of avatars to selected locations for, for example, administrative purposes or protection of the VU or individual avatars and which may have very substantial commercial value for purposes of advertising, promotion and/or education, for example, to provide information to avatars of important alerts or new developments in products or services in a manner which is much enhanced in many respects from "real world" potentialities, particularly in regard to incentives for participation therein. Numerous conveniences and features of value to avatars and residents as well as to advertisers and VU administrators are provided and the range of incentives that may be provided is greatly expanded relative to those likely to be practical and effective in the "real world" and can be implemented very simply by providing for comparison of current avatar status and conditions with pre-established rules for automatic invitation acceptance and augmented with search tools which are well-understood in the art to selectively issue invitations when rules are likely to be met for a particular avatar and auto-teleportation invoked.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method of operating a virtual universe system on a plurality of networked data processors, said method comprising steps of:
 configuring at least one data processor of said plurality of data processors to provide:
  means for automatically searching through said virtual universe system to determine an avatar that is available and suitable for being issued a teleportation invitation;
  means for issuing said teleportation invitation through said virtual universe system to said avatar determined by said means for automatically searching from a sender other than a resident corresponding to said avatar determined by said means for automatically searching;
  means for manually accepting or rejecting said teleportation invitation;
  means for automatically accepting said teleportation invitation based on at least one rule established for said avatar determined by said means for automatically searching by a resident associated with said determined avatar,
  wherein said rule is one of a login rule, a role or status based rule, an activity based rule, a group-based rule, and a schedule-based rule,
  means for issuing a sequential automated teleportation invitation through said virtual universe to said avatar determined by said means for automatically searching; and
  means for automatically accepting said sequential automated teleportation invitation until a threshold criteria is met,
  wherein said threshold criteria comprises at least one of a set of number of teleportations and a set period of time.

2. The method as recited in claim 1, comprising the further step of:
 configuring at least one data processor of said plurality of data processors to provide:
  means for providing a delay prior to operation of said means for automatically accepting said teleportation invitation.

3. The method as recited in claim 1, comprising the further step of:
 configuring at least one data processor of said plurality of data processors to provide:
  means for comparing said rule corresponding to said avatar with current status of said avatar and a location in said virtual universe wherein said means for issuing said teleportation invitation is responsive to said means for comparing.

4. The method as recited in claim 1, wherein said means for issuing said teleportation invitation is responsive to an alert or status of said virtual universe system.

5. The method as recited in claim 1, wherein said means for automatically searching includes searching through at least one of metadata corresponding to properties and attributes of said avatar, specified conditions of consent for automatically accepting said teleportation invitation, and current location status of said avatar to determine suitability of said avatar.

* * * * *